Patented Oct. 8, 1940

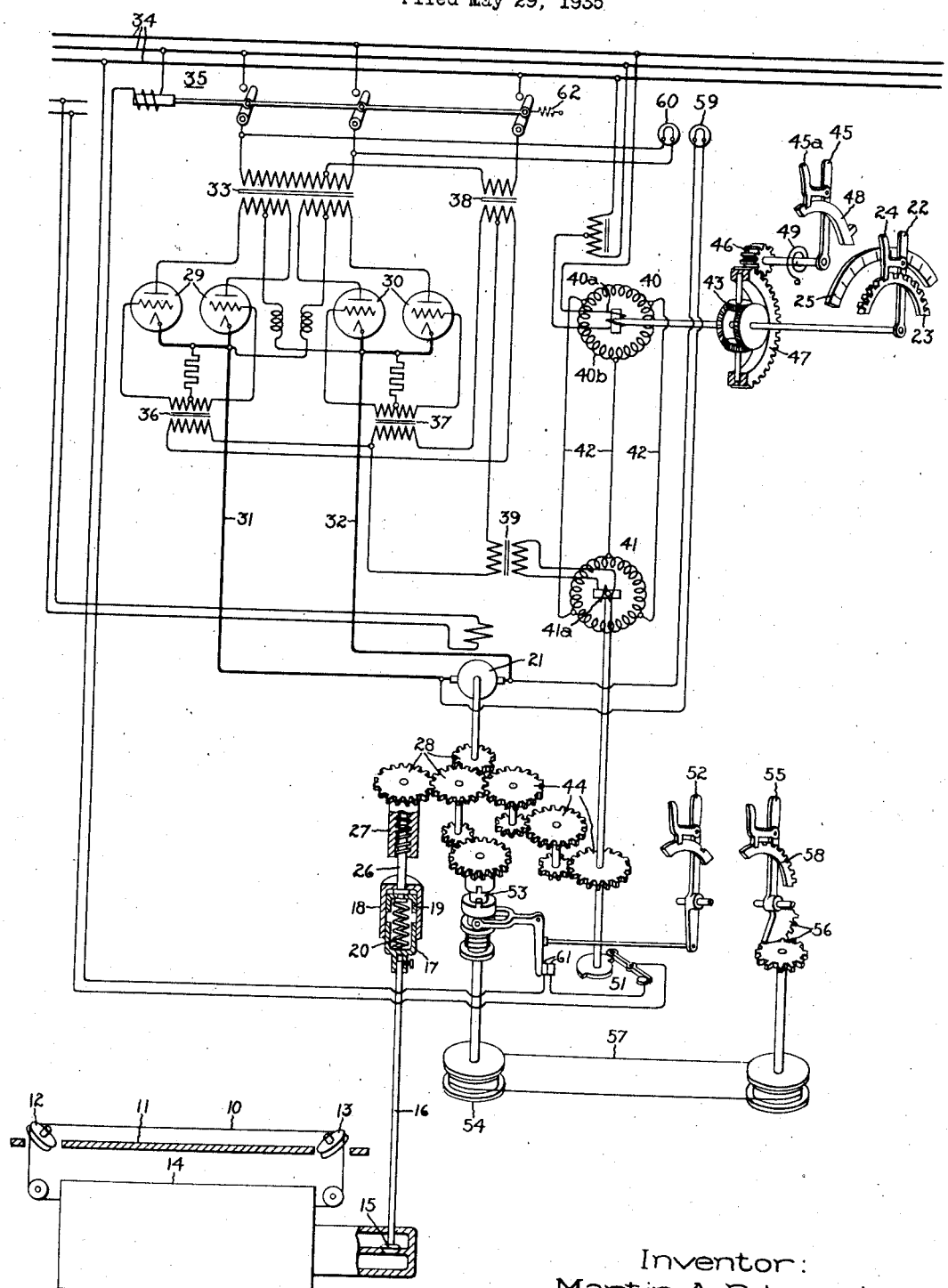

2,217,399

UNITED STATES PATENT OFFICE 2,217,399

CONTROL SYSTEM

Martin A. Edwards, Schenectady, N. Y., assignor to General Electric Company, a corporation of New York Application May 29, 1935, Serial No. 23,993

6 Claims. (Cl. 172—239)

This invention relates to control systems, more particularly to remote control systems and it has for an object the provision of a simple, reliable and improved control system of this character.

More specifically, the invention relates to remote control systems, in which a controlled object is caused to move to positions corresponding to positions or settings of a pilot device, and a specific object of the invention is the provision of means for causing the controlled object to move away from its position of correspondence and to return to the position of correspondence without disturbing the setting of the pilot device.

One aspect of the invention relates to control systems for arresting gear utilized in landing airplanes on the deck of a ship or on a platform, and a more specific object is the provision of means for resetting the arresting gear after each landing operation, without disturbing the setting of the device which controls the airplane retarding effect of the arresting gear.

In carrying the invention into effect in one form thereof, a control device and means controlled thereby are provided for moving the controlled object from an initial position to a selected position determined by the setting of the control device, and additional means are provided for moving the controlled object from this selected position and returning the controlled object to the selected position while maintaining the setting of the control device.

In illustrating the invention in one form thereof, it is shown as embodied in a system for actuating the controlling valve for the run out mechanism of arresting gear utilized in landing airplanes on the deck of a ship.

For a better and more complete understanding of the invention, reference should now be had to the following specification and to the accompanying drawing, the single figure of which is a simple diagrammatical illustration of an embodiment of the invention.

Referring now to the drawing, a cable 10 is stretched transversely across the deck 11 of a ship and passes about angularly disposed pulley blocks 12 and 13 and suitable guide pulleys to the run out mechanism 14 which is arranged beneath the landing deck. In the form illustrated, the run out mechanism comprises means for storing the cable 10 and a plunger within a cylinder containing liquid. When the cable 10 is pulled out by an airplane, it causes the plunger to force the liquid from the cylinder to another cylinder against a suitable air pressure. The retarding effect is controlled by suitable means illustrated as a valve 15 which controls the rate of flow of the liquid from one cylinder to the other. Since the constructional details per se of the run out mechanism constitute no part of the present invention, it is shown conventionally in the drawing with a portion of the cylinder broken away to illustrate the control valve.

The push rod 16 of the valve is connected to a cup-shaped member 17 which telescopes within a housing member 18. An inverted cup-shaped member 19 is mounted within the housing member 18 and a spring 20 is arranged within the housing between the cup-shaped members 17 and 19. Movement of the member 19 varies the compression of the spring 20 and likewise the pressure of the valve 15 against the seat. The member 19 is moved by a suitable driving means illustrated as an electric motor 21 to any selected position within its range determined by the setting of a control device illustrated as a movable lever 22. As shown, the lever 22 is provided with a toothed arcuate shaped member 23 and with a latch member 24 for locking the lever 22 in any selected position on the arcuate member 23. The range of movement of the lever 22 corresponds with the range of movement of the cup-shaped member 19 and a calibrated scale 25 cooperating with the lever 22 provides an indication of the position of the member 19 and also an indication of the pressure on valve 15.

The cup-shaped member 19 which serves as a projector for compressing the spring 20 is secured to the end of a threaded screw 26, which screws into a threaded nut 27. Suitable reduction gearing 28 provides a driving connection between the shaft of the motor 21 and the nut 27.

Direct current is supplied to the armature of the motor 21 by means of electric valve apparatus illustrated as comprising a pair of valves 29 for supplying current in one direction to the armature of the motor and a second pair of valves 30 for supplying current to the armature in the opposite direction. As shown, the armature of the motor 21 is connected in the output circuit 31, 32 of the electric valve apparatus.

Electric power is supplied to the valve apparatus 29, 30 through a supply transformer 33 from a suitable source represented in the drawing by the three supply lines 34 to the upper and middle lines of which the terminals of the primary winding of the transformer are connected through the contacts of an electromagnetic switching device 35. The secondary winding of the transformer 33 comprises two coils the terminals of which are connected to the anodes of the pairs of valves 29 and 30 as illustrated. Although the electric valves may be of any suitable type, they are preferably of the three electrode type into the envelope of which a small quantity of an inert gas, such for example as mercury vapor, is introduced after exhaust. The presence of the mercury vapor within the valves serves to convert the usual pure electron discharge into an arc stream, thereby constituting the valves electrostatically or grid controlled arc rectifiers. Each pair of valves is connected for full wave rectification, that is to say, the anodes of each pair of valves are connected to opposite terminals of the associated secondary winding of the supply transformer, whilst the cathodes of each pair of valves are connected to one of the conductors 31, 32 of the output circuit and through the load to the mid-point of the associated supply transformer secondary winding.

Alternating voltage is supplied to the grids of the valve apparatus by means of grid supply transformers 36 and 37, the primary windings of which are connected in series relationship with each other and with the secondary winding of the grid bias transformer 38, whereas the opposite terminals of the secondary windings of each of the grid transformers 36 and 37 are respectively connected to the grids of the associated pair of electric valves. One terminal of the primary winding of the grid bias transformer 38 is connected to the lower supply line 34, through the right-hand contact of the switch 35, and the opposite terminal is connected to an intermediate point of the primary winding of the supply transformer 33, thereby giving the grid voltage of the electric valve apparatus an initial phase bias with respect to the anode voltage. This initial phase bias may be any desired amount but is preferably substantially 90° lagging.

The average value of the current flowing in the output circuit of electric valve apparatus of the foregoing type is varied as desired by varying the phase relationship between the grid and anode voltages. For example, when the grid and anode voltages are substantially in phase with each other, the current flowing in the output circuit is maximum and when the grid and anode voltages are substantially 180° out of phase with each other, the current is minimum or zero, whilst for intermediate phase relationships the current has corresponding intermediate values.

In order to vary the phase relationship between the grid and anode voltages, a component voltage of variable magnitude is supplied to the grid circuit substantially in phase with the anode voltage by means of a transformer 39, the opposite terminals of the secondary winding of which are respectively connected to a point between the primary windings of the grid transformers 36 and 37 and a mid-point of the secondary winding of the grid bias transformer 38. The primary winding of this transformer is connected to the upper and middle supply lines of the source 34 through rotary induction apparatus comprising a voltage transmitting device 40 and a voltage receiver regulating device 41. The rotary induction device 40, referred to as the transmitter, comprises a rotor member provided with a single phase winding 40a and a stator member provided with a distributed three element winding 40b, which is physically similar to the polyphase winding of the usual polyphase dynamo-electric machine. The stator and rotor windings are arranged in inductive relationship with each other so that the alternating magnetic field produced by the current flowing in the primary winding induces voltages in the legs of the secondary winding.

The receiver 41 is in all respects identical with the transmitter 40 and the terminals of its stator winding are connected to the terminals of the stator winding of the transmitter by means of conductors 42 so that the voltages induced in the stator winding of the transmitter cause currents to flow in the stator winding of the receiver, thereby producing a magnetic field similar to the magnetic field produced by the current flowing in the single phase rotor winding of the transmitter.

The rotor winding 41a of the receiver is connected to the terminals of the primary winding of the transformer 39 and the terminals of the primary winding of the transmitter 40 are connected to the upper and middle supply lines of the supply source 34. When the electric valve apparatus 29, 30 is inactive, the axis of the rotor winding of the receiver is at right angles to the axis of the magnetic field produced by the primary winding. Rotation of the rotor winding of the transmitter causes a voltage to be induced in the rotor winding of the receiver as a result of the rotation of the magnetic field of the receiver. The magnitude of this induced voltage depends upon the angular relationship of the axis of the rotor winding to the axis of the magnetic field. For example, when the axes of the magnetic field and of the rotor winding are parallel, the induced voltage is maximum, whereas when these axes are at right angles with each other the induced voltage is a minimum and is substantially zero. Likewise it will be clear that any voltage induced in the rotor winding of the receiver is substantially in phase with the voltage across the top and middle supply lines of the source 34 and is, therefore, substantially in phase with the voltage supplied to the anodes of the electric valve apparatus 29, 30.

Thus, it will be clear that rotation of the rotor of the transmitter or of the receiver will vary the magnitude of the component voltage supplied to the grid circuit of the electric valve apparatus which in turn will result in a variation in the phase relationship of the resultant of the component voltage supplied through the transformer 39 and the grid bias voltage supplied through the transformer 38. In other words, rotation of the rotor members of the transmitter and receiver will produce a variation in the phase relationship between the grid and anode voltages of the electric valve apparatus and a corresponding variation in the current supplied to the armature of the driving motor 21. The grid connections of the electric valve apparatus are so made that when the phase of the grid voltage of one pair of valves is advanced, the phase of the grid voltage of the other pair of valves is retarded and consequently only one pair of valves is active at any selected instant.

The rotor of the transmitter 40 is connected through a suitable differential gearing device 43 to the control member 22 and the rotor of the receiver 41 is connected through suitable reduction gearing 44 to the shaft of the drive motor 21 and, therefore, to the spring actuating member 19.

An auxiliary lever 45 is connected through a pinion gear 46 and a sector gear 47 to the third element of the differential device 43. This lever 45 is provided with a latch 45a which cooperates with an arcuate-shaped member 48 having a single notch with which the latch member engages to provide an initial or normal position for the lever 45. Clockwise rotation of the lever 45 may be effected manually, and suitable biasing means, illustrated as a spring 49, are provided for returning the lever 45 to its initial position when released by the operator. Since both the adjusting lever 22 and the auxiliary lever 45 are connected to the rotor of the transmitter 40, rotation of either of these levers while the other is at rest will effect a rotation of the rotor of the transmitter, thereby producing a variation in the phase relationship between the grid and anode voltages of the electric valve apparatus causing one or the other of the pairs of valves 29, 30 to become conducting and supply current to the motor 21 for rotation in a direction corresponding to the direction of rotation of the levers.

Suitable limit switch mechanism 51 connected to the rotor of the receiver 41 and controlling the electromagnetic switching device 35 is provided for the purpose of limiting the rotation of the receiver to less than 180°. The reason for this limitation is to insure self-synchronous operation between the transmitter and receiver for the entire range of movement of the spring actuating member 19. In the absence of such protective means, if the rotor of the receiver ever became more than 180° out of phase with its normal position with respect to the rotor of the transmitter, the driving motor 21 when started would rotate in the wrong direction and jam the mechanism.

The system is also provided with means for manually controlling the setting of the valve 15 in the event of an emergency disabling the remote control. A lever 52 is provided for actuating a clutch 53 to establish driving connections between the spring actuating mechanism 17, 18, 19 and the driving member 54. A manually operated lever 55 which is connected to the driving member 54 through gearing 56 and a cable 57 serves to move the spring actuating member 19 to a position determined by the setting of the lever 55 on the arcuate-shaped member 58.

With the above-understanding of the apparatus and its organization in the completed system, the operation of the system itself will readily be understood from the following details of description:

To place the system in condition for remote control operation, the lever 52 is actuated to the position in which it is illustrated, thereby disengaging the clutch mechanism 53 and completing an operating circuit for the operating coil of the electromagnetically operated switch 35, which closes its contacts to complete power connections from the source 34 to the input and output circuit of the electric valve apparatus 30. With the lever 22 and the auxiliary lever 45 in their left-hand initial positions and with the rotor winding of the receiver 41 at right angles to the magnetic field of the stator winding, the electric valve apparatus 29 and 30 is deenergized and the motor 21 is at rest.

The operator then operates the control lever 22 to an intermediate position on the scale 35 which the operator has found by experience to correspond with a desired pressure setting of the valve 15. Rotation of the lever 22 in a clockwise direction produces a rotation of the magnetic field of the stator winding of the receiver, thereby inducing a voltage in the rotor winding. This induced voltage energizes one of the pairs of valves, e. g. the pair of valves 29 to supply current to the armature of the motor 21 causing it to rotate and actuate the member 19 to compress the spring 20, and apply a pressure to the valve 15. Rotation of the motor 21 also rotates the rotor of the receiver to a position in which the rotor winding is at right angles to the new position of the axis of the magnetic field of the stator winding. When the rotor winding reaches this position, the pair of electric valves 29 is deenergized and the motor 21 stops. As a result, the spring 20 is compressed and a pressure determined by the setting of the lever 22 is applied to the valve 15.

The system is now in condition to retard the speed of an airplane landing on the deck 11. Usually the airplane lands at a very high speed. As it approaches the cable 10, a hook on the landing gear engages the cable and pulls it out of the run out mechanism 14. As stated in the foregoing, this pulling out of the cable causes a plunger to move in a cylinder and force a liquid past the valve 15 from one cylinder to another. The pressure of the valve 15 against its seat determines the rate at which the liquid flows from one cylinder to the other when the cable 10 is being pulled out by the airplane and consequently controls the retarding effect of the run out mechanism on the airplane.

When the speed of the landing airplane has been sufficiently reduced, deck hands disengage the hooks from the cable 10 and allow the airplane to taxi to an elevator or to another part of the deck.

To reset the control system for a subsequent landing operation, it is only necessary for the operator at the remote control station to rotate the lever 45 in a clockwise direction from its initial position to a limiting position. This causes the rotor of the transmitter 40 to rotate in the opposite direction and to energize the pair of electric valves 30 to supply current to the motor 21 in the opposite direction. This reverse rotation of the motor rotates the nut 27 in the reverse direction and releases the compression of the spring 20 and finally raises the valve 15 from its seat. After an amount of rotation of the motor 21 proportional to the amount of rotation of the lever 45, the axis of the rotor winding of the receiver 41 is again perpendicular to the axis of the magnetic field and the electric valves 30 are deenergized and the motor 21 is stopped with the valve 15 held open This allows the fluid to return through the valve opening 15 from the cylinder in which it was compressed to the plunger cylinder and also allows the cable storing means to take up the cable 10 to its initial position across the deck.

The operator at the remote control station then releases the lever 45 and the biasing spring 49 returns it to its initial position. In returning to its initial positon, the lever 45 turns the rotor of the transmitter in a direction to energize the pair of valves 29 and as a result the motor 21 is again energized to close the valve 15 and to apply a pressure thereto. Since the lever 45 in returning to its initial position moves through the same distance as when rotated from its initial position, the motor 21 moves the spring actuating member 19 to its previous position and thus the compression of the spring 20 is restored to the same value, i. e., the value determined by the setting of the adjusting lever 22.

The advantage of this arrangement is that in resetting the system for subsequent landing operation, it is unnecessary to disturb the adjustment of the adjusting lever 22, since the resetting is accomplished merely by rotating the auxiliary or retrieve lever 45 from its initial fixed position to a limiting position and to release the lever when the cable 10 is again taut across the deck. Thus, the retrieving or resetting operation can easily be carried out in the dark without observation of adjustment or setting, which may be essential in time of war.

In order to indicate whether the motor 21 is operating as intended, a repeat back lamp 59 positioned before the operator at the remote control station is connected to the armature terminals of the motor 21. When the motor is in operation the counter-electromotive force across its armature terminals is sufficient to illuminate the lamp and thus to apprise the operator that the motor is in rotation. A similar indicating lamp 60 connected across the terminals of the power supply indicates the presence or failure of power.

In the event of power failure or other emergency, the lever 52 is rotated in a clockwise direction to engage the clutch 53 and thus to connect the valve actuating mechanism 17, 18, 19 to the manually operated lever 55. The engagement of the clutch opens the contact 61 thereby interrupting the energizing circuit of the switching device 35 and allowing the spring 62 to open the switch and disconnect the electric valve apparatus from the power supply. Thus, if the arresting gear is being operated by manual control during a power failure, the return of power cannot energize the motor 21 during the manual operation.

Although in accordance with the provisions of the patent statutes, this invention is described as embodied in concrete form, it will be understood that the apparatus and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A control system comprising in combination a movable object, an electric motor for driving said object, supply means for said motor comprising electric valve apparatus provided with an output circuit connected to said motor and with an input circuit for controlling the current supplied to said motor, means for controlling the voltage supplied to said input circuit, a device for actuating said voltage controlling means to cause said motor to move said object from an initial position to a selected position determined by the setting of said device, a second device for actuating said voltage controlling means, a differential device providing connection between said actuating devices and said voltage controlling means whereby movement of said second actuating device in one direction from an initial position causes said motor to move said object in the opposite direction from said selected position while maintaining the setting of said first actuating device, and means biasing said second actuating device to its said initial position so that upon release of said second actuating device said motor returns said object to said selected position.

2. A control system comprising a movable object, an electric motor for moving said object, supply means for said motor comprising electric valve apparatus provided with an output circuit connected to said motor and an input control circuit for controlling the current supplied to said motor, rotary induction apparatus for controlling the voltage of said input circuit comprising a transmitting device and a receiving device each having a rotor member and a stator member, a manually presettable device connected to the rotor of said transmitting device for causing said motor to move said object to a position corresponding to the setting of said manually presettable device, a second manually operated device connected to the rotor of said transmitting device and biased to an initial position, and a differential device in the connections between said manually operable devices and the rotor of said transmitting device to provide for movement of said object to a second position in response to movement of said second device from its initial position and for restoring said object to its original position upon release of said second device while maintaining the setting of sad first device.

3. A remote control system for valves and the like, an electric motor for varying the pressure of said valve against its seat, supply means for said motor comprising electric valve apparatus provided with an output circuit connected to said motor, and with an input circuit, rotary induction apparatus for controlling the voltage of said input circuit to control the current in said output circuit comprising a voltage transmitting device and a voltage receiving device each having a rotor member and a stator member, a manually operated device connected to the rotor of said transmitting device for causing said motor to apply a pressure to said valve determined by the setting of said manually operable device, a second manually operated device connected to the rotor of said transmitting device and biased to an initial position, and a differential device in the connections between said manually operated devices and the rotor of said transmitter device to provide for release of the pressure on said valve in response to movement of said second device from an initial position and for restoring said pressure upon release of said second device while maintaining the setting of said first device.

4. A control system comprising in combination a movable object, an electric motor for driving said object, means for controlling the energization of said motor comprising a voltage varying device having a movable element, a manually presettable device connected to said element for causing said motor to move said object to a position corresponding to the setting of said device, a second manually operated device connected to said movable element and biased to an initial position, and a differential device in the connections between said manually operated devices and said movable element to provide for movement of said object to a second position in response to movement of said second device from an initial position and for restoring said object to its initial position upon release of said second device while maintaining the setting of said first device.

5. A system for the remote control of the setting of valves and the like comprising an electric motor for varying the pressure of the valve, means for controlling the energization of said motor comprising a voltage varying device having a movable element, a manually presettable device connected to said element for causing said motor to apply a pressure to said valve corresponding to the setting of said device, a second manually operated device connected to said movable element and biased to an initial position, and a differential device included in the connections between said manually operated devices and movable element to provide for release of the pressure on said valve upon movement of said second device from its initial position and for restoring said pressure upon release of said second device while maintaining the setting of said first device.

6. A remote control system for valves and the like comprising in combination an electric motor for varying the pressure of the valve against its seat, a source of electric power and electric valve apparatus supplied therefrom for supplying said motor, a switching device for controlling the supply to said motor, a control device for said valve apparatus for causing said motor to apply a pressure to said valve determined by the setting of said device, a second control device for said valve apparatus for causing said motor to open said valve while maintaining the setting of said first device, a manually operated device connected to said valve, a clutch in the connections between said manually operated device and said valve, and electric circuit connections controlled by said clutch for controlling said switching device.

MARTIN A. EDWARDS.